(12) United States Patent
Amin (10) Patent No.: US 10,505,976 B2
(45) Date of Patent: Dec. 10, 2019

(54) REAL-TIME POLICY FILTERING OF DENIAL OF SERVICE (DOS) INTERNET PROTOCOL (IP) ATTACKS AND MALICIOUS TRAFFIC

(71) Applicant: T-Mobile USA, Inc., Bellevue, WA (US)

(72) Inventor: Rahul Amin, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 375 days.

(21) Appl. No.: 15/393,066

(22) Filed: Dec. 28, 2016

(65) Prior Publication Data

US 2018/0183831 A1    Jun. 28, 2018

(51) Int. Cl.
*H04L 29/06*    (2006.01)

(52) U.S. Cl.
CPC ...... *H04L 63/1458* (2013.01); *H04L 63/0236* (2013.01); *H04L 63/14* (2013.01); *H04L 63/1416* (2013.01); *H04L 63/1441* (2013.01); *H04L 2463/141* (2013.01)

(58) Field of Classification Search
CPC . H04L 63/14; H04L 63/1408; H04L 63/1416; H04L 63/1425; H04L 63/1441; H04L 63/145; H04L 63/1458; H04L 63/1491
See application file for complete search history.

(56) References Cited

U.S. PATENT DOCUMENTS

| 2008/0162679 A1* | 7/2008 | Maher | H04L 63/1458 709/223 |
| 2015/0026766 A1* | 1/2015 | Holloway | H04L 63/1458 726/1 |

* cited by examiner

*Primary Examiner* — Edward Zee
(74) *Attorney, Agent, or Firm* — Han Santos, PLLC (57) ABSTRACT

This disclosure describes techniques that facilitate dynamic filtering and blocking of Denial of Service (DoS) Internet Protocol (IP) attacks via a Real-time Filtering policy (RFP) Server. The RFP server may transmit an anti-attack packet towards a source IP address that has been identified as initiating a DoS IP attack. The anti-attack packet may include an Explicit Congestion Notification (ECN) value that echoes congestion to the source IP address, thereby alerting the source IP address that the RFP server is aware of the intended DoS IP attack. Further, the RFP server may generate, modify, and share filter criteria with one or more MGM node(s) of a multicast network, thereby improving DoS IP attack detection capabilities across the multicast network. Filter criteria may include, but is not limited to, source IP address, destination IP address, file size of IP packets, and a frequency by which IP packets are delivered.

19 Claims, 8 Drawing Sheets

REAL-TIME POLICY FILTERING OF DENIAL OF SERVICE (DOS) INTERNET PROTOCOL (IP) ATTACKS AND MALICIOUS TRAFFIC

BACKGROUND

Present day, Internet Protocol (IP) networks are under constant threat of Denial of Service (DoS) IP attacks and malicious IP traffic that has a capability of causing congestion within available network bandwidth, while also interfering with the functionality of nodes such as routers, switches, application servers. Network administrators are able to identify computing devices (i.e. nodes) that are subject to a DoS IP attack. In doing so, network administrators may manually create and push filtering policies to affect nodes for the purpose of negating the effect of the DoS IP attack. However, manually determining attacks and generating a corrective filtering policy is generally inefficient and among other things may mean that substantial network and application outages may occur before the filtering policy is implemented.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes techniques that facilitate dynamic filtering and blocking of Denial of Service (DoS) Internet Protocol (IP) attacks via a Real-time Filtering policy (RFP) server. The RFP server 104 may transmit an anti-attack packet towards a source IP address that has been identified as initiating the DoS IP attack. The anti-attack IP packet may be configured to alert a MGM node (MGM) node of the source IP address. Further, the RFP server may generate, modify, and share filter criteria with one or more nodes that include MGM node(s) in the IP network. Each MGM node may filter IP packets based on the filter criteria, thereby improving DoS IP attack detection capabilities across the multicast network. Filter criteria may include, but is not limited to, source IP address, destination IP address, file size of IP packets, and a frequency by which IP packets are being sent from a source IP address or delivered to a destination IP address.

In the illustrated example, the RFP server may dynamically execute algorithms that collect data files associated with a DoS IP attack. The DoS IP attack and other malicious IP traffic may be identified by security device(s) associated with electronic devices such as Web/Application Service (WAS) Device. In response to receiving an indication of a DoS IP attack, the RFP server may transmit an anti-attack packet towards the source IP address that initiated the DoS IP attack. The anti-attack IP packet may include an IP header that is generated by switching the source IP address and destination IP address of the DoS IP attack. In other words, the source IP address of the DoS IP attack is defined as a destination IP address within the IP header of the anti-attack IP packet. Similarly, the destination IP address of the DoS IP attack is defined as the source IP address within the IP header of the anti-attack packet. Further, the anti-attack packet may include an Explicit Congestion Notification (ECN) value that corresponds to a particular integer that echoes congestion. By including an ECN value that echoes congestion, the RFP server may alert the MGM node of source IP address of the DoS IP attack that the RFP server is aware of the intended DoS IP attack.

Further, the term "techniques," as used herein, may refer to system(s), method(s), computer-readable instruction(s), module(s), algorithms, hardware logic, and/or operation(s) as permitted by the context described above and throughout the document.

Figure 1A:
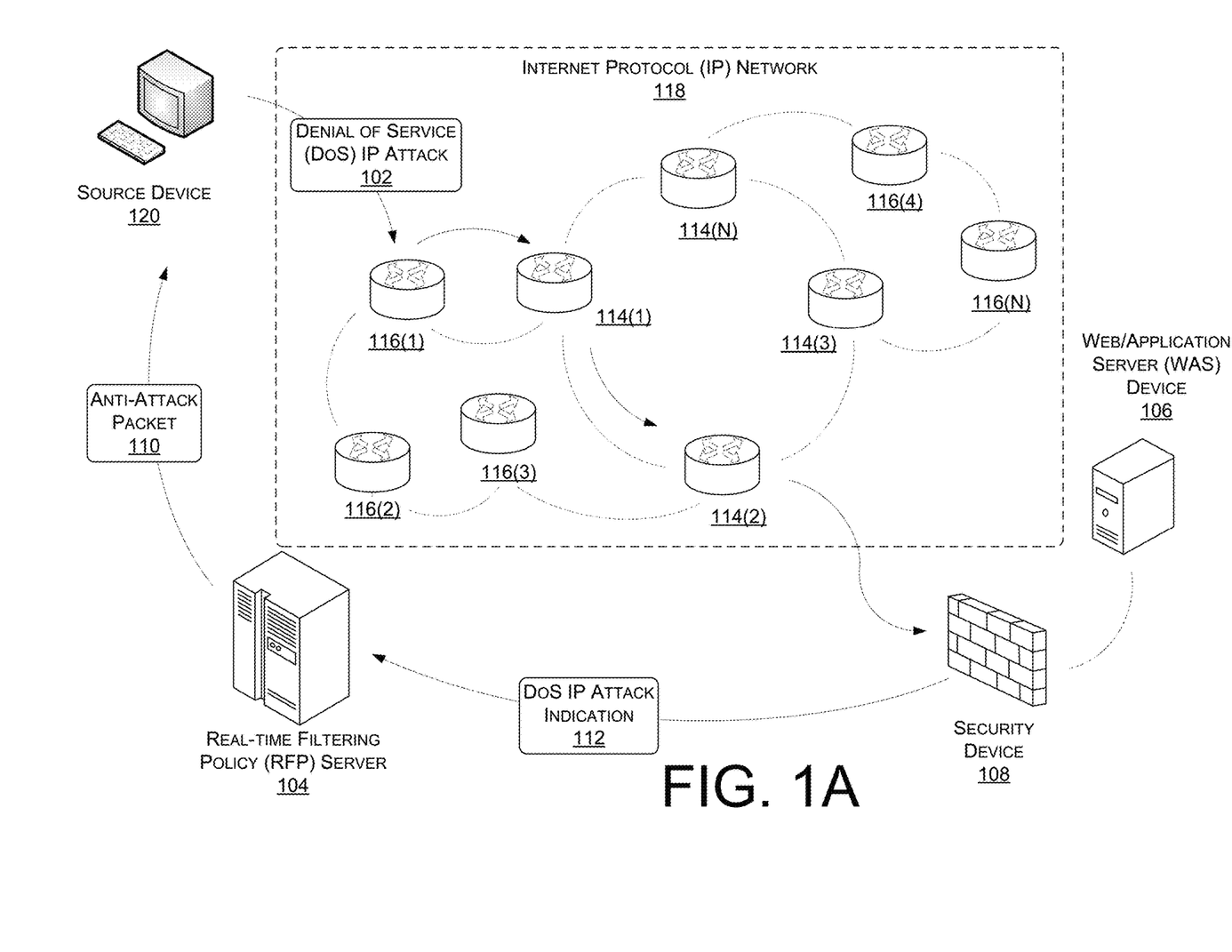
FIGS. 1A and 1B illustrate a schematic view of a computing environment 100 that facilitates dynamically filtering and blocking a Denial of Service (DoS) Internet Protocol (IP) attack via a real-time filtering policy (RFP) server.
Figure 1B:
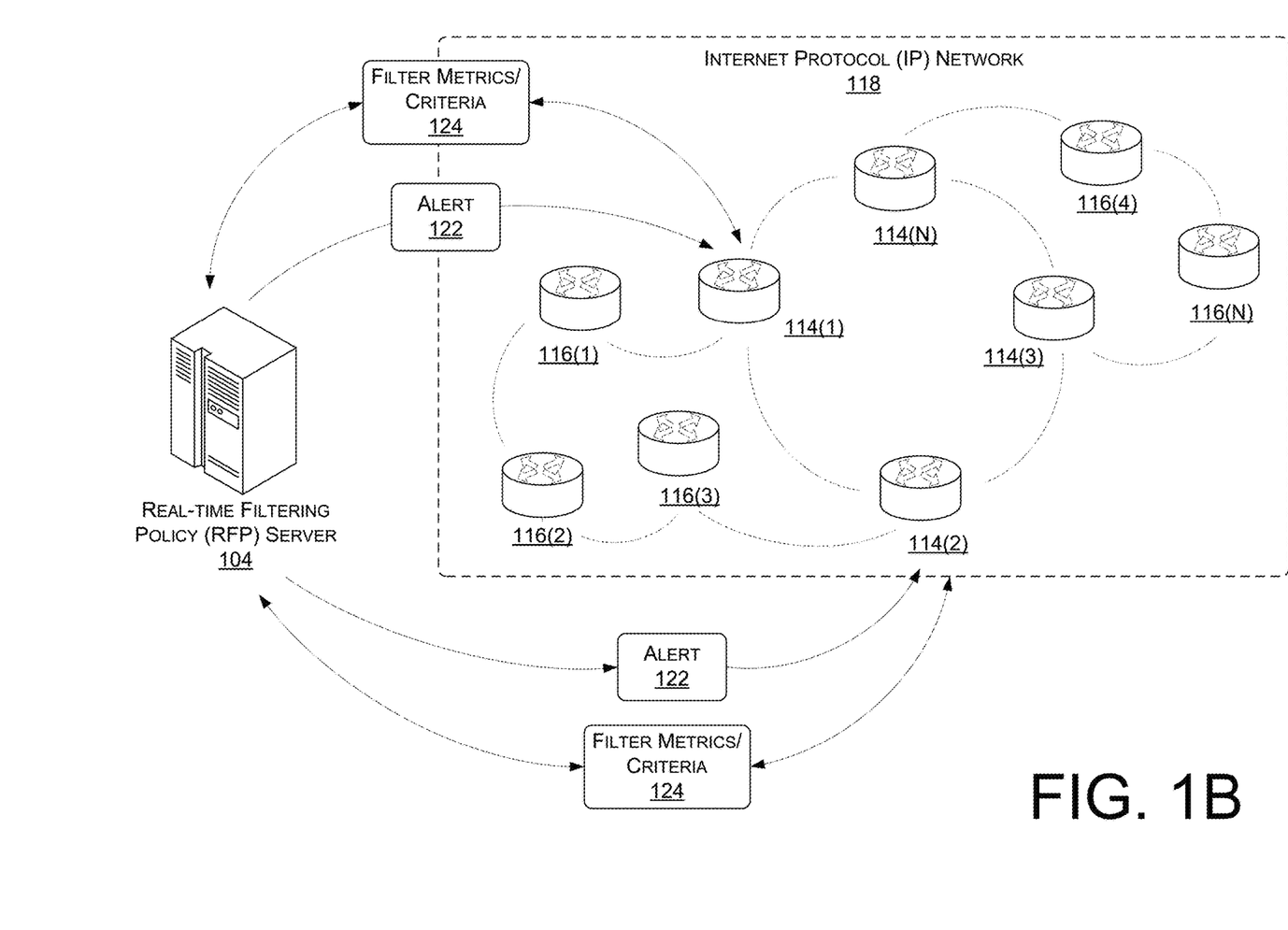

FIGS. 1A and 1B illustrate a schematic view of a computing environment 100 that dynamically filters and blocks a Denial of Service (DoS) Internet Protocol (IP) attack 102 via a Real-time Filtering Policy (RFP) server 104. Particularly, FIG. 1A illustrates a source device 120 that generates and directs a DoS IP attack 102 towards a Web/Application Server (WAS) device 106. The DoS IP attack 102 may be routed via one or more nodes 116(1)-116(N), including MGM node(s) 114(1)-114(N), towards an intended destination, WAS device 106. The one or more nodes 116(1)-116 (N), including the MGM node(s) 114(1)-114(N) is a communicative device communicatively connected to other communicative devices that are configured wither as endpoints or configured to forward, route, or modify data to be routed. A security device 108 at an interface with the WAS device 106 may detect and prevent the DoS IP attack 102 from gaining access to the WAS device 106. In doing so, the security device 108 may transmit an indication to the RFP server 104 that a DoS IP attack 102 has been detected.

Further, the RFP server 104 may execute algorithms that dynamically retrieve data associated with DoS IP attacks based at least in part on receiving an indication 112 from the security device 108 that a DoS IP attack 102 has been detected. The data may include data files, data streams and data payloads in packets. In another example, the security device 108 may push the data files associated with DoS IP attack 102 to the RFP server 104 in response to the security device 108 detecting and blocking the DoS IP attack 102.

In response to receiving an indication 112 of a DoS IP attack 102, and retrieving data associated with the DoS IP attack 102, the RFP server 104 may generate and transmit an anti-attack IP packet 110 to the source IP address that initiated the DoS IP attack 102. The source IP address may be defined in the IP header of a data file associated with the DoS IP attack 102. The anti-attack IP packet 110 may include an IP header that is generated by switching the source IP address and destination IP address of the DoS IP attack 102. In other words, the source IP address of the DoS IP attack 102 is defined as a destination IP address within the IP header of the anti-attack IP packet 110. Similarly, the destination IP address of the DoS IP attack 102 is defined as the source IP address within the IP header of the anti-attack IP packet 110. Further, the anti-attack IP packet 110 may include an Explicit Congestion Notification (ECN) value that corresponds to a particular integer that echoes congestion towards a source IP address that initiated delivery of the DoS IP attack 102. An ECN value is an extension to the Internet Protocol and allows end-to-end notification of network congestion without dropping data packets. In this example, RFP server 104 may assign an ECN value that echoes upstream congestion for the purpose of making operators at the source IP address aware that the DoS IP attack 102 has been detected.

In the illustrated example, the RFP server 104 may be communicatively coupled to one or more nodes that include MGM nodes 114(1), 114(2), 114(3), and 114(N) of an Internet Protocol (IP) network 118, and one or more nodes 116(1)-116(N) outside of the IP network 118. The MGM node(s) 114(1), 114(2), 114(3), and 114(N) may be participating nodes in an IP network 118, whereby data may be communicated from a single distribution point—the RFP server 104—to the plurality of the one or more MGM node(s) 114(1)-114(N). In this instance, the RFP server 104 may simultaneously communicate with MGM node(s) 114(1)-114(N). The RFP server 104 may communicate with all MGM node(s) 114(1)-114(N) of a IP network 118 at a same time. Alternatively, the RFP server 104 may communicate with a portion, but not all, of the MGM node(s) 114(1)-114(N) of the IP network 118. Considering the illustrated example shown in FIGS. 1A and 1B, the RFP server 104 may selectively communicate with MGM node(s) 114(1) and 114(2) that substantially align with a communication path between the source device 120 and the intended destination of the DoS IP attack 102, the WAS device 106. In some examples, alignment may be based on proximity, administrative grouping. In other examples, alignment may be an indication of a preferential route to one node over other nodes. In other examples, the RFP server 104 may communicate with substantially all MGM node(s) 114(1)-114(N) within the IP network 118.

In FIG. 1B, the RFP server 104 may generate and transmit an alert 122 to one or more nodes that may include MGM node(s) 114(1)-114(N) of the IP network 118. The alert 122 may indicate that a DoS IP attack 102 has been detected. In some examples, the alert 122 may also include the intended destination IP address of the DoS IP attack 102. In the illustrated example, the RFP server 104 may configure and transmit the alert 122 to MGM node(s) 114(1) and 114(2) that substantially align with a communication between the source IP address of the DoS IP attack 102 and the intended destination IP address of the DoS IP attack 102. In another example, the alert 122 may be transmitted to all participating nodes of the IP network 118. The purpose of doing so may be to provide each multicast MGM node with information that may be incorporated into existing filter policies for the purpose of providing improved detection mechanisms for future DoS IP attacks.

In the illustrated example, the MGM node(s) 114(1) and 114(2) may generate and transmit filter metrics to the RFP server 104. In various examples, the filter metrics may include a number of instances in which one or more filters block incoming IP packets based on criteria such as source IP address, destination IP address, file size of IP packets, and a frequency by which IP packets are being sent from a source IP address or delivered to a destination IP address.

Further, upon receiving filter metrics from MGM node(s) 114(1) and 114(2), the RFP server 104 may generate and transmit filter criteria 124 to the MGM node(s) 114(1) and 114(2). The filter criteria 124 may comprise of adjusting predetermined thresholds of existing filters, disabling existing filters, or generating new filters, thereby improving DoS IP attack detection capabilities across the multicast network. The filtering criteria may include a source IP address, a destination IP address, a file size of IP packets, and a frequency by which IP packets are being sent from a source IP address or delivered to a destination IP address.

In the illustrated example, the source device 120 and WAS device 106 may include any sort of electronic device, such as a cellular phone, a smart phone, a tablet computer, an electronic reader, a media player, a gaming device, a personal computer (PC), a laptop computer, etc.

Further, the one or more MGM node(s) 114(1)-114(N) that form the IP network 118 may include a number of MGM nodes that facilitate network communications and/or form a hardware basis for network communications, such as switches, routers, gateways, access points, firewalls, base stations, repeaters, backbone devices, and the like.

In the illustrated example, the RFP server 104 may operate on one or more distributed computing resource(s). The distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, via one or more network(s). For example, the one or more network(s) may include public networks such as the Internet, private networks such as an institutional and/or personal intranet, or some combination of private and public networks. The one or more network(s) can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof.

Figure 2:
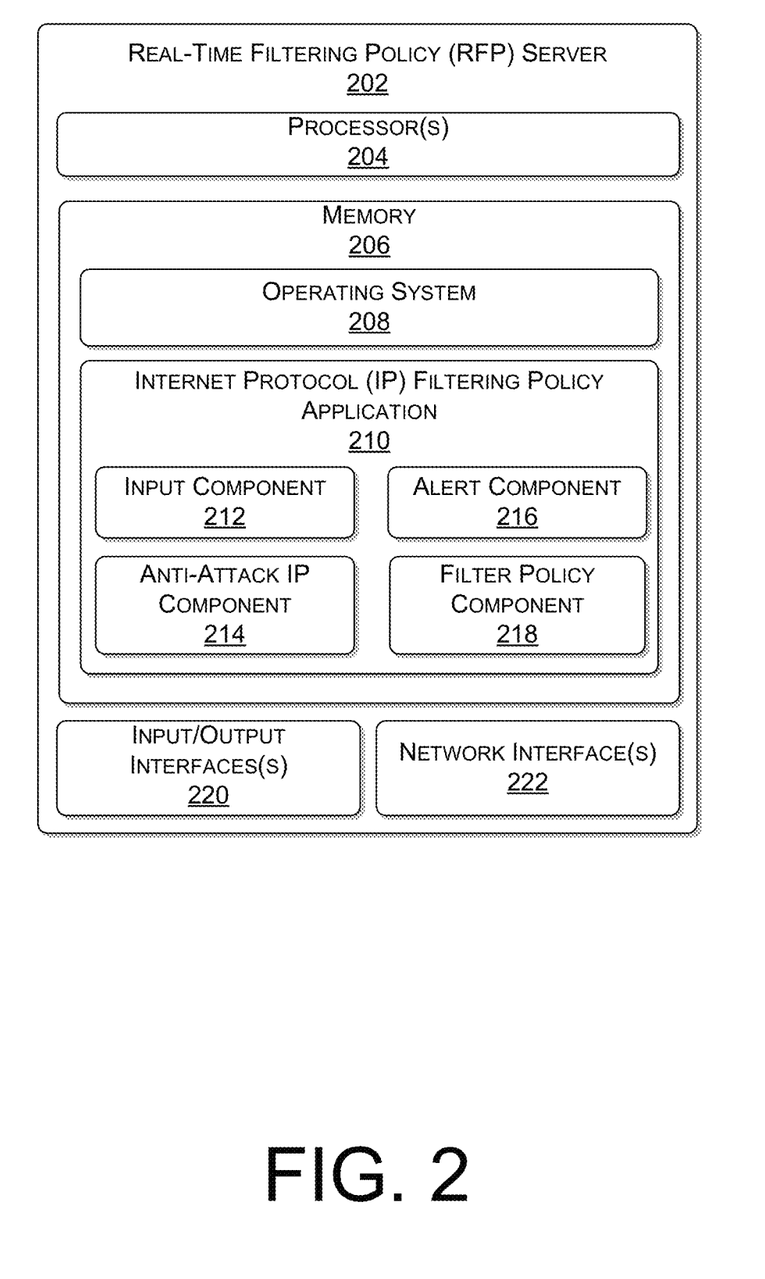
FIG. 2 illustrates a block diagram of a RFP server that may automate algorithms to collect DoS IP attacks and other malicious IP traffic identified by security device/firewall(s), and other security nodes available within a multicast network.

FIG. 2 illustrates a block diagram of a real-time filtering policy (RFP) server 202 that may automate algorithms to collect Denial of Service (DoS) IP attacks and other malicious Internet Protocol (IP) traffic identified by security device/firewall(s), and other security nodes available within a multicast network. Further, the RFP server 202 may generate an anti-attack packet that is transmitted towards a source IP address of a DoS IP attack. The anti-attack packet may be configured to alert a source IP address that the RFP server 202 is aware of the intended DoS IP attack that is directed towards the destination IP address.

The RFP server 202 may also send an IP attack alert and filtering policies to participating MGM nodes of the IP network. In some examples, the attack alert may notify participating nodes of the intended DoS IP attack packet at a destination IP address. Further, filtering policies may restrict data flow from a source device or to a destination device, associated with the destination IP address, based on one or more criteria. The one or more criteria may include, but are not limited to, a source IP address, a destination IP address, a rate of data packets being transmitted from a source IP address or to a destination IP address, or a size of data packets being transmitted from a source IP address or to a destination IP address.

In various examples, the RFP server 202 may transmit an attack alert and/or filtering policies to MGM nodes within a IP network. For example, the RFP server 202 may limit transmission to participating nodes that substantially align with a communication path between a source device 120 of the DoS IP attack packet and the intended destination IP address (i.e. WAS device 106). In other examples, the attack alert and the filtering policies may be transmitted to all participating nodes of the multicast network.

In the illustrated example, the RFP server 202 may correspond to the RFP server 104. Further, the RFP server 202 may include one or more processor(s) 204 that are operably connected to memory 206. In at least one example, the one or more processor(s) 204 may be a central processing unit(s) (CPU), graphics processing unit(s) (GPU), a both a CPU and GPU, or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 204 may also be responsible for executing all computer applications stored in the memory, which can be associated with common types of volatile (RAM) and/or nonvolatile (ROM) memory.

In some examples, memory 206 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 206 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 206 may include an operating system 208 and an IP filtering policy application 210. The operating system 208 may be used to implement the IP filtering policy application 210. The operating system 208 may be any operating system capable of managing computer hardware and software resources. The IP filtering policy application 210 may include routines, program instructions, objects, and/or data structures that perform particular tasks or implement particular abstract data types.

In the illustrated example, the IP filtering policy application 210 may include an input component 212, an anti-attack IP component 214, an alert component 216, and a filter policy component 218. The input component 212 may receive an indication from a participating MGM node that a DoS IP attack has been detected. In some examples, the input component may execute algorithms that dynamically detect and retrieve data associated with DoS IP attacks from participating nodes of a multicast network. Further, the input component 212 may also receive filter metrics from participating nodes. The filter metrics may indicate a number of instances that one or more filters block incoming IP packets based on criteria such as source IP address, destination IP address, file size of IP packets, and a frequency by which IP packets are being sent from a source IP address or delivered to a destination IP address.

The anti-attack IP component 214 may generate an anti-attack IP packet that is transmitted towards a source IP address that initiated a DoS IP attack. The anti-attack IP packet may be configured to alert one or more nodes, including MGM nodes, that the RFP server 202 is aware of the intended DoS IP attack that is directed towards a destination IP address. The anti-attack IP packet may be based at least in part on data included within an IP header of a data file associated with the DoS IP attack.

The anti-attack IP component 214 may parse through the data file associated with the DoS IP attack and selectively discard all data other than a first IP header. The first header may denote information that includes, but is not limited to, a source IP address that initiated delivery of the DoS IP attack and a destination IP address that was intended for delivery of the DoS IP attack. Further, the anti-attack IP packet may comprise of a second IP header that includes a source IP address field, a destination IP address field, and an Explicit Congestion Notification (ECN) field.

The anti-attack IP component 214 may generate the anti-attack IP packet by assigning the source IP address from the DoS IP attack data file to the destination IP address field of the second IP header. Further, the destination IP address from the DoS IP attack data file may be assigned to the source IP address field of the second IP header. The purpose of doing so is to configure transmission of the anti-attack IP packet to the source IP address that initiated delivery of the DoS IP attack, while also providing operators at the source IP address, upon receipt of the anti-attack IP packet, with notice that the DoS IP attack had been detected.

Further, the anti-attack IP component 214 may also assign a particular integer to the ECN field of the second IP header. The ECN value is an extension to the Internet Protocol and allows end-to-end notification of network congestion without dropping data packets. In some examples, an ECN value that corresponds to a particular integer may be used to echo congestion towards a source IP address that initiated delivery of a data packet. In doing so, operators at the source IP address may reduce transmission rates of data packets based on an indication of upstream congestion. In this example, the anti-attack IP component 214 may assign an ECN value that echoes upstream congestion for the purpose of making operators at the source IP address aware that the DoS IP attack has been detected.

The filter policy component 218 may generate one or more criteria that enable filters at MGM nodes to block delivery or receipt of IP packets. The one or more criteria may include a source IP address, a destination IP address, a file size of IP packets, and a frequency by which IP packets are being sent from a source IP address or delivered to a destination IP address.

The filter policy component 218 may adjust existing filtering criteria, or generate new filtering criteria based on filtering metrics received from a MGM node. Further, the filter policy component 218 may be configured to transmit the adjusted and/or new filtering criteria to relevant, participating MGM nodes. In a non-limiting example, filtering metrics from a MGM node may report that a file size of IP packets being sent from a source IP address are less than a predetermined threshold, and a number of instances of IP packets being sent from a particular source IP address also less than a predetermined threshold. However, the filtering metrics may also report that the combination of the file size and number of instances of the IP packets is likely to cause congestion, even though each criteria, individually, is less than their respective predetermined thresholds. Thus, the filter policy component 218 may adjust one of the file size criteria, the frequency criteria, or a combination of both. Alternatively, or additionally, the filter policy component 218 may generate and transmit new filtering criteria that may be intended to block IP packets initiated at the source IP address.

The alert component 216 may generate an alert indicating that a DoS IP attack has been detected. The alert may include the intended destination IP address of the DoS IP attack. In a non-limiting example, the alert component 216 may configure and transmit an alert to one or more nodes, including MGM nodes, that substantially align with a communication path between the source IP address of the DoS attack and the intended destination IP address of the DoS attack. In another non-limiting example, the alert component 216 may configure and transmit an alert to all participating nodes of a multicast network. The purpose of doing so may be to provide each MGM node with information that may be incorporated into existing filter policies for the purpose of providing improved detection mechanisms for future DoS IP attacks.

In the illustrated example, the RFP server 202 may further include input/output interface(s) 220. The input/output interface(s) 220 may include any type of output interface known in the art, such as a display (e.g. a liquid crystal display), speakers, a vibrating mechanism, or a tactile feedback mechanism. Input/output interface(s) 220 also include ports for one or more peripheral devices, such as headphones, peripheral speakers, or a peripheral display. Further, the input/output interface(s) 220 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

In the illustrated example, the RFP server 202 may further include one or more network interface(s) 222. The one or more network interface(s) 222 may include any sort of transceiver known in the art. For example, the one or more network interface(s) 222 may include a radio transceiver that performs the function of transmitting and receiving radio frequency communications via an antenna. In addition, the one or more network interface(s) 222 may also include a wireless communication transceiver and a near field antenna for communicating over unlicensed wireless Internet Protocol (IP) networks, such as local wireless data networks and personal area networks (e.g. Bluetooth or near field communication (NFC) networks). Further, the one or more network interface(s) 222 may include wired communication components, such as an Ethernet port or a Universal Serial Bus (USB).

Figure 3:
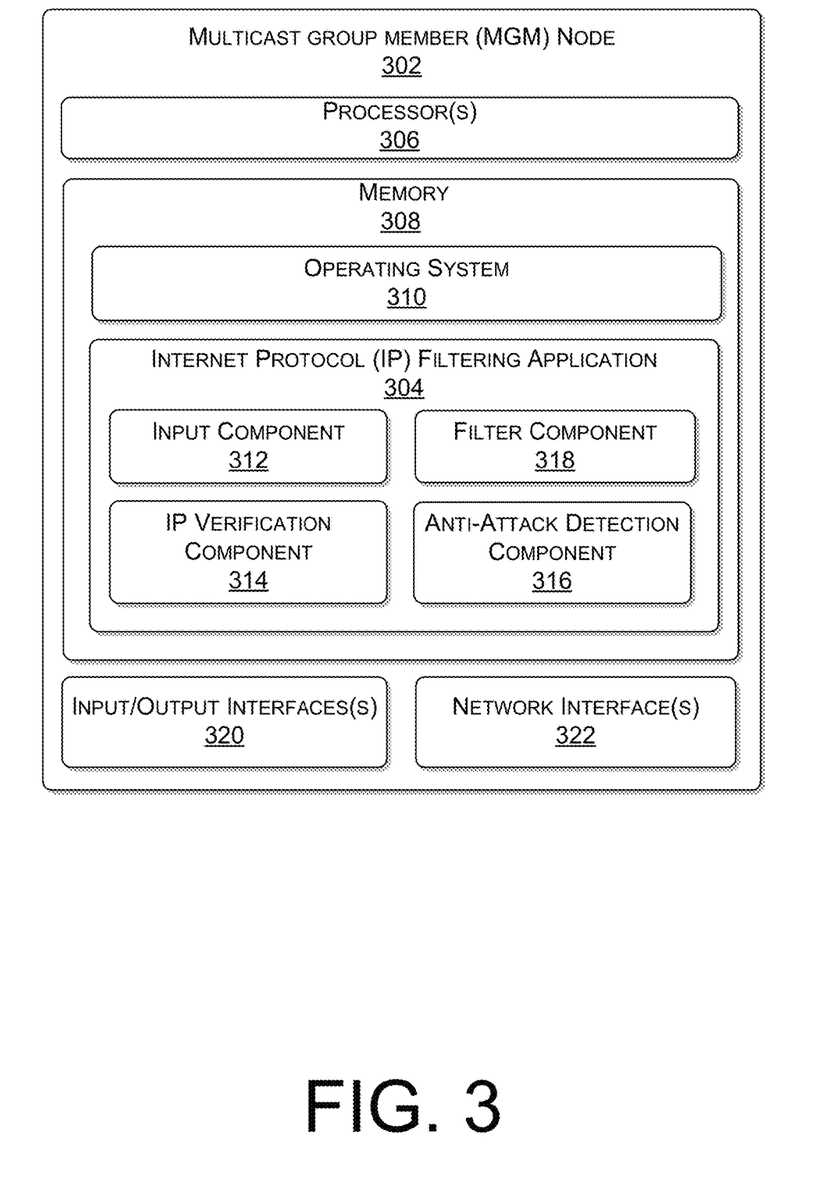
FIG. 3 illustrates a block diagram of a multicast node that may execute an IP filtering application based on data received from an IP filtering policy application.

FIG. 3 illustrates a block diagram of a Multicast Group Member (MGM) node 302 that may execute an IP filtering application 304, based on data received from a filtering policy application 218. In some examples, the IP filtering application 304 may receive an anti-attack packet from an RFP server 202 indicating a destination IP address of an intended DoS IP attack packet. Further, the IP filtering application 304 may execute a filter policy that limits IP traffic through the MGM node 302. The filter policy may be based at least in part on one or more criteria specified by a filter policy component 218 of the RFP server 202. In a non-limiting example, the one or more criteria may include, but are not limited to, a source IP address, a destination IP address, a rate of data packets being transmitted from a source IP address or to a destination IP address, or a size of data packets being transmitted from a source IP address or to a destination IP address.

In the illustrated example, the MGM node 302 may correspond to IP network 118 node. Further, the MGM node 302 may include one or more processor(s) 306 operably connected to memory 308. The one or more processor(s) 306 may correspond to the one or more processor(s) 204, and the memory 308 may correspond to the memory 206.

In the illustrated example, the memory 308 may include an operating system 310 and the IP filtering application 304. The operating system 310 may be used to implement the IP filtering application 304. Further, the operating system 310 may be any operating system capable of managing computer hardware and software resources. The IP filtering application 304 may include routines, program instruction, objects, and/or data structures that perform particular tasks or implement particular abstract data types.

In the illustrated example, the IP filtering application 304 may further include an input component 312, an IP verification component 314, an anti-attack detection component 316, and a filter component 318. The input component 312 may receive alerts and filtering criteria from an RFP server 202.

The IP verification component 314 may initiate a verification test for IP packets that are directed towards the MGM node. In some examples, the MGM node 302 may execute an algorithm that initiates a unicast reverse path forwarding verification, which is intended to verify the veracity of a source IP address of an IP packet. In a first non-limiting example, the IP verification component 314 may determine that an IP packet does not pass the verification test. In doing so, the multicast node may quarantine the IP packet, thereby preventing delivery to an intended destination IP address. Alternatively, or additionally, the IP packet may be erased. In a second non-limiting example, the MGM node 302 may determine that the IP packet, intended for delivery to a destination IP address, passes the verification test.

The anti-attack detection component 316 may execute an algorithm that parses through data within an IP header that has passed the verification test initiated by the IP verification component 314. Particularly, the anti-attack detection component 316 may identify an Explicit Congestion Notification (ECN) value within the IP header of an IP packet. It is noteworthy that the RFP server 202 may set the ECN value of an anti-attack IP packet to a particular integer that is intended to self-identify the IP packet as an anti-attack IP packet. Thus, by parsing through the data within an IP header of the IP packet, the anti-attack detection component 316 may identify an IP packet as an anti-attack IP packet based at least in part on the ECN value.

The filter component 318 may generate one or more filters to block incoming IP packets based at least in part on one or more filter criteria. The filter component 318 may receive the filtering criteria from the filter policy component 218 of the RFP server 202. The filtering criteria may include a source IP address, a destination IP address, a file size of IP packets, and a frequency by which IP packets are being sent from a source IP address or delivered to a destination IP address. Filtering criteria may also be based on information within an alert from the RFP server 202 that indicates the detection of a DoS IP attack that is directed towards a destination IP address.

Further, the filter component 318 may generate one or more filters based on predetermined thresholds set by the filter policy component 218 of the RFP server 202. For example, the filter policy component 218 may set predetermined thresholds that permit the delivery and/or receipt of the IP packets based on a limit to an IP packet file size, or a frequency by which IP packets are being received and/or delivered.

The filter component 318 may also generate filter metrics that indicate a number of instances that one or more filters block incoming IP packets based on the above-referenced filtering criteria. The filter metrics may then be transmitted to the filter policy component 218 of the RFP server 202. In doing so, the RFP server may interrogate the filter metrics and determine whether to adjust predetermined thresholds of existing filters, disable existing filters, or generate new filters. FIGS. 4, 5, 6, and 7 present processes 400, 500, 600, and 700 that relate to operations of the data usage analytics application. Each of processes 400, 500, 600, and 700 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400, 500, 600, and 700 are described with reference to the computing environment 100 of FIG. 1.

In the illustrated example, the MGM node 302 may include input/output interface(s) 320 and network interfaces(s) 322. The input/output interface(s) 320 and the network interface(s) 322 may correspond to the input/output interface(s) 220 and the network interface(s) 222 respectively.

Figure 4:
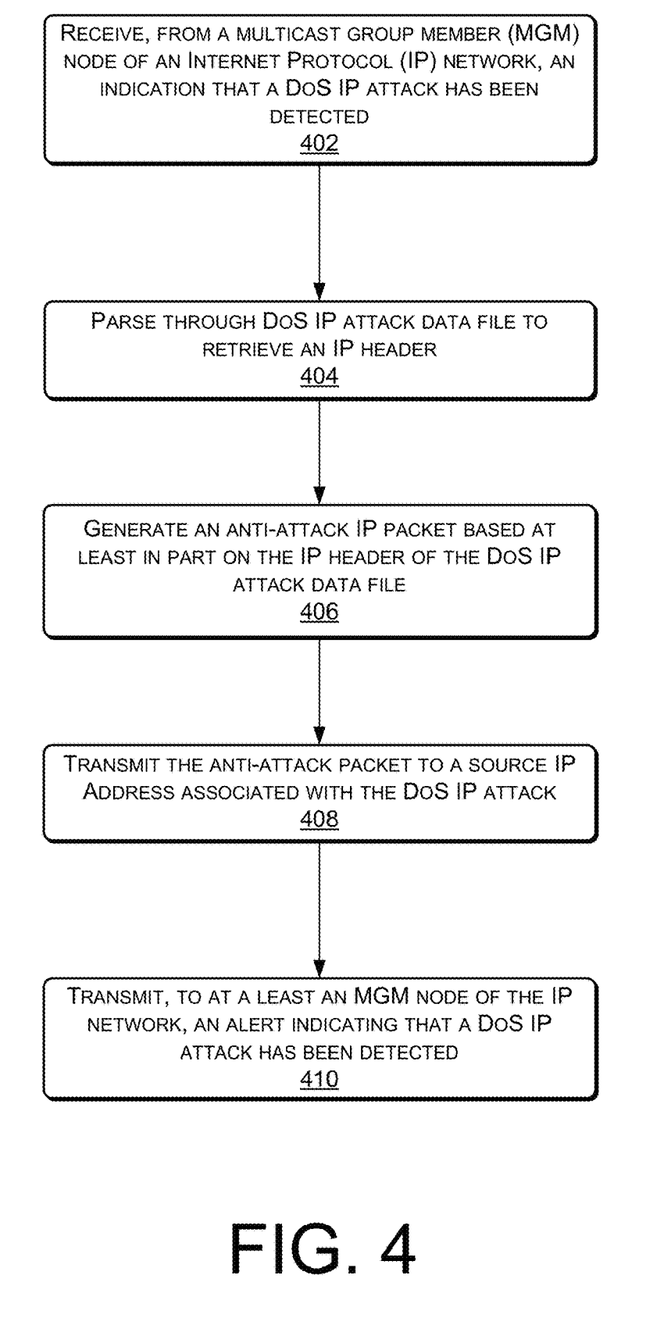
FIG. 4 illustrates a flow diagram of RFP server process for transmitting an anti-attack packet towards a source IP address associated with DoS IP attack packet, and transmitting anti-attack alert to a participating MGM node in the IP network.

FIG. 4 illustrates a flow diagram of a Real-time Filtering Policy (RFP) server process for transmitting an anti-attack packet towards a source Internet Protocol (IP) address associated with a Denial of Service (DoS) IP attack, and transmitting at least one anti-attack alert to a participating node of a multicast group. In various examples, the anti-attack packet may be configured to alert a source IP address that the RFP server is aware of the intended DoS IP attack packet directed towards the destination IP address.

At 402, the RFP server may receive an indication, from a multicast group member (MGM) nod of an IP network, that a DoS IP attack has been detected as being directed towards a Web Application Server (WAS) device. In some examples, the RFP server may execute algorithms that dynamically detect and retrieve data associated with DoS IP attack(s) from node(s), such as the MGM node, within the multicast network.

At 404, the RFP server may parse through the DoS IP attack data file and selectively discard all data other than the IP header. The IP header may denote information such as, but not limited to, a source IP address that initiated delivery of the DoS IP attack and a destination IP address that was intended for delivery of the DoS IP attack.

At 406, the RFP server may generate an anti-attack IP packet that is configured for transmission towards a source IP address from which the DoS IP attack had originated. The anti-attack IP packet may include an anti-attack IP header that is based at least in part on the IP header of the DoS IP attack data file. The anti-attack IP header may denote a destination IP address that is substantially equivalent to the source IP address from the IP header of DoS IP attack data file. Further, the anti-attack IP header may include an ECN value set to a particular integer that echoes traffic congestion to the destination IP address. This in turn provides notice to operators at the source IP address that the RFP server has detected the DoS IP attack and is aware that the DoS IP attack had originated from the source IP address.

At 408, the RFP server may transmit the anti-attack IP packet to the source IP address that initiated the DoS IP attack. In various examples, the anti-attack IP packet may be transmitted to the source IP address via a same communication path as the DoS IP attack. In other words, the anti-attack IP packet may be transmitted via a same set of nodes that are part of the multicast network. The same set of nodes may be situated along a communication path between the source IP address of the DoS IP attack and the intended destination IP address of the DoS IP attack.

At 410, the RFP server may transmit, to at least an MGM node of the IP network, an alert indicating that the DoS IP attack has been detected. The alert may include the intended destination IP address of the DoS IP attack. In doing so, the third node may incorporate information from the alert into existing filter policies for the purpose of providing improved detection mechanisms for future DoS IP attacks. In some examples, the RFP server may transmit the attack alert to a portion, but not all, of participating MGM nodes of the IP network that substantially align with a communication path between the source IP address of the DoS attack and the intended destination IP address of the DoS IP attack. In other examples, the alert may be transmitted to all participating nodes of a multicast network.

Figure 5:
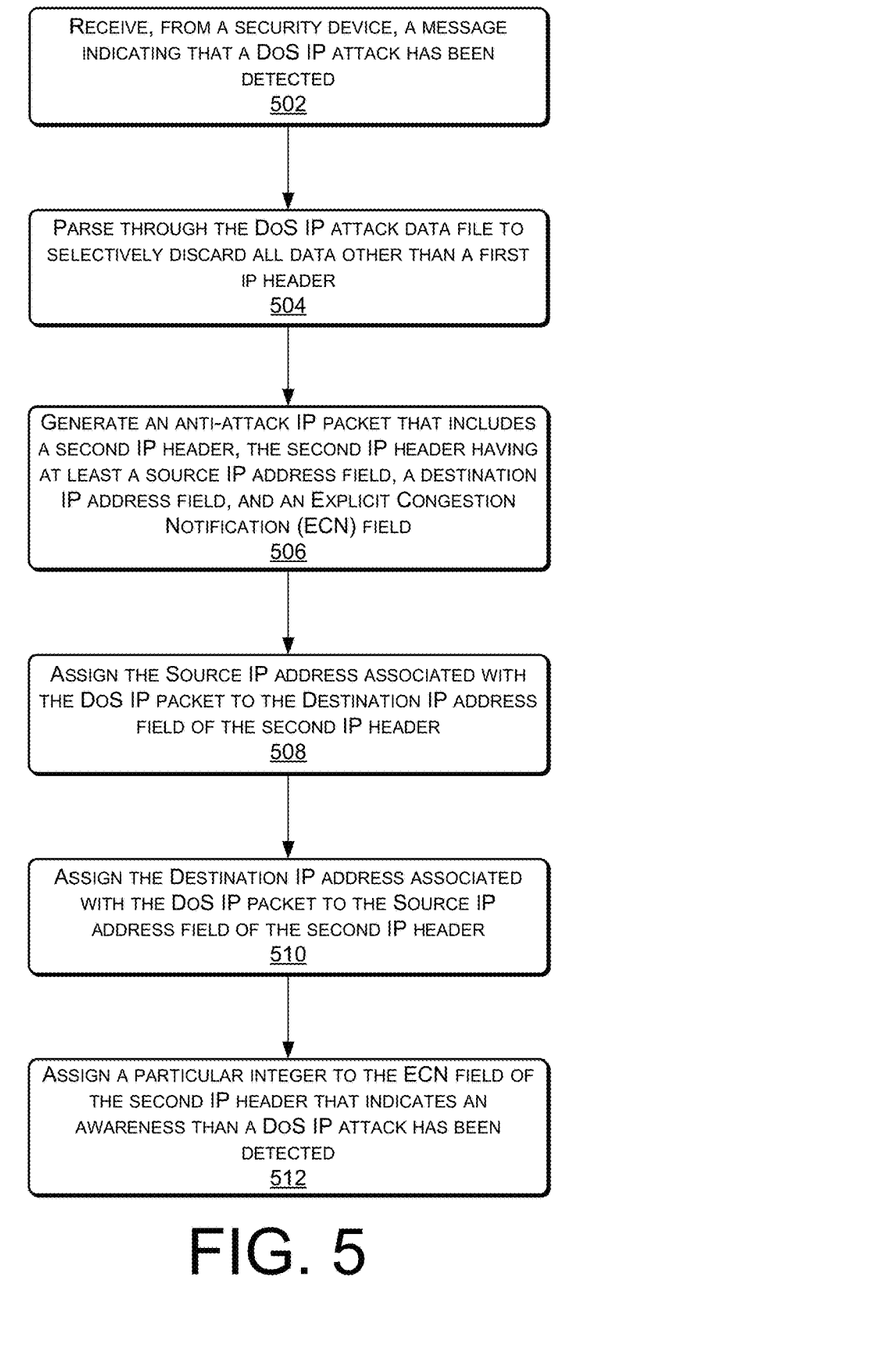
FIG. 5 illustrates a flow diagram of a RFP server process for generating an anti-attack IP packet that is intended for delivery towards a source IP address that initiated a DoS IP attack.

FIG. 5 illustrates a flow diagram of a Real-time Filtering Policy (RFP) server process for generating an anti-attack Internet Protocol (IP) packet that is intended for delivery towards a source IP address that initiated a Denial of Service (DoS) IP attack. The anti-attack IP packet may be based at least in part on source IP address and a destination IP address that is included within an IP header of a data file associated with the DoS IP attack.

At 502, the RFP server may receive, from a security device, a message indicating that a DoS IP attack has been detected as being directed towards a Web Application Service (WAS) device. Further, the message may include data associated with the DoS IP attack(s). In some examples, the first node may correspond to a security device, a firewall, or an Intrusion Detection System (IDS) that is associated with the WAS device.

At 504, the RFP server may parse through the data file associated with the DoS IP attack and selectively discard all data other than a first IP header. The first IP header may denote information such as, but not limited to, a source IP address that initiated delivery of the DoS IP attack and a destination IP address that was intended for delivery of the DoS IP attack.

At 506, the RFP server may generate an anti-attack IP packet that includes a second IP header. The second IP header may include a source IP address field, a destination IP address field, and an Explicit Congestion Notification (ECN) field. The ECN field corresponds to an extension to the Internet Protocol that allows end-to-end notification of network congestion without dropping data packets.

At 508, the RFP server may assign the source IP address from the DoS IP attack data file to the destination IP address field of the second IP header of the anti-attack IP packet. The purpose of doing so is to configure transmission of the anti-attack IP packet to the source IP address that initiated delivery of the DoS IP attack.

At 510, the RFP server may assign the destination IP address from the DoS IP attack data file to the source IP address field of the second IP header of the anti-attack IP packet. The purpose of doing so is to provide operators at the source IP address, upon receipt of the anti-attack IP packet, with notice that the DoS IP attack that was intended for delivery to the destination IP address has been detected.

At 512, the RFP server may assign a particular integer to the ECN field of the second IP header. The ECN value is an extension to the Internet Protocol and allows end-to-end notification of network congestion without dropping data packets. In some examples, an ECN value that corresponds to a particular integer may be used to echo congestion towards a source IP address that initiated delivery of a data packet. In doing so, operators at the source IP address may reduce transmission rates of data packets based on an indication of upstream congestion. In this example, the anti-attack IP packet may include an ECN value that echoes upstream congestion for the purpose of making operators at the source IP address, as well as other participating nodes of the multicast network, aware that the DoS IP attack has been detected.

Figure 6:
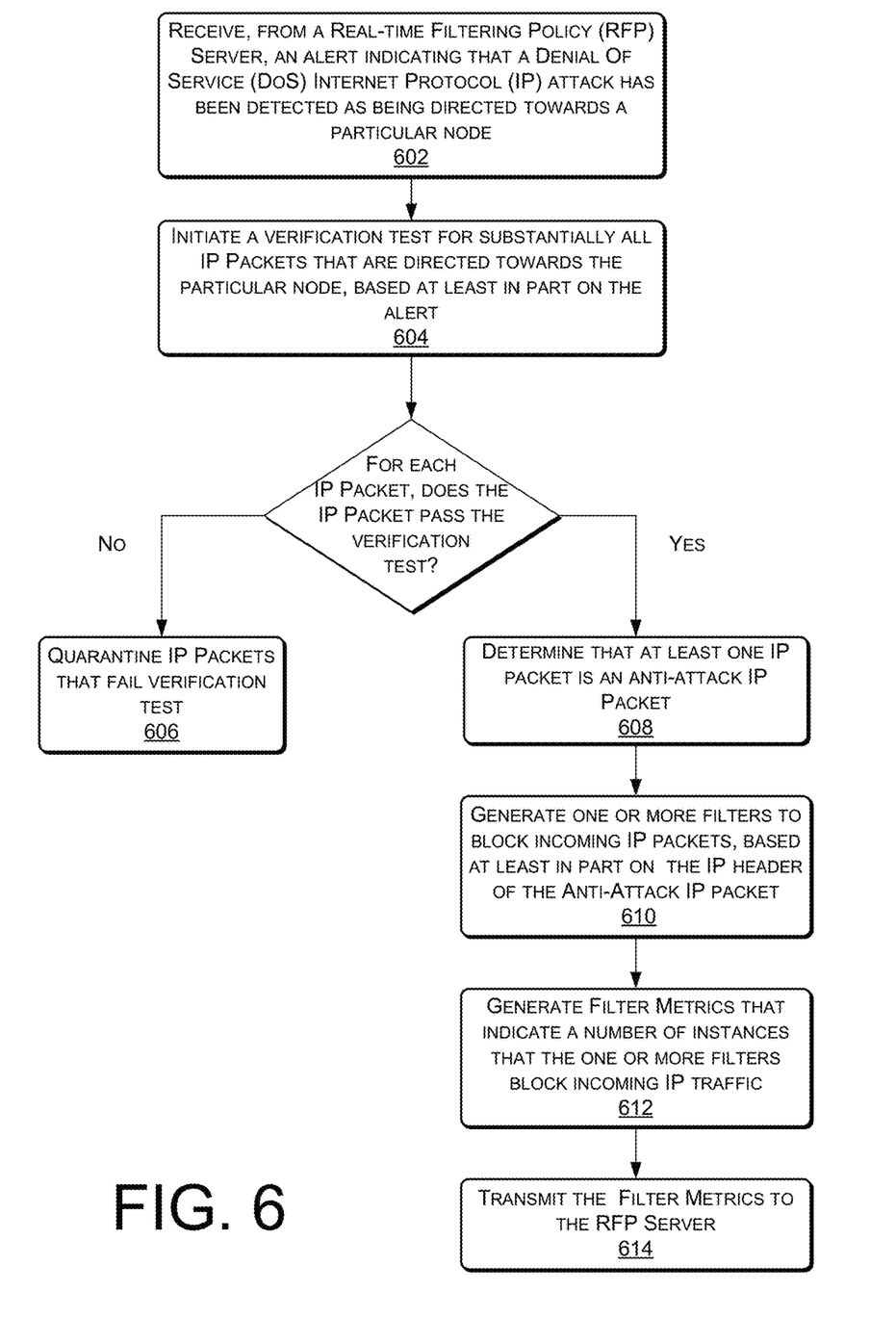
FIG. 6 illustrates a flow diagram of a MGM node nodes process for executing a filter policy based on an indication that a RFP server has detected a DoS IP attack.

FIG. 6 illustrates a flow diagram of a MGM node process for executing a filter policy based on an indication that a Real-Time Filter Policy (RFP) server has detected a Denial of Service (DoS) Internet Protocol (IP) attack. In some examples, the MGM node may be situated along a communication path between a source IP address that initiated delivery of the DoS IP attack and the intended destination IP address.

At 602, the MGM node may receive, from the RFP server, an alert indicating that a DoS IP attack has been detected as being directed towards a particular node. In some examples, the alert may include the source IP address that initiated delivery of the DoS IP attack and the intended destination IP address. Further, the destination IP address may be associated with a Web/Application Server device.

At 604, in response to receiving an alert from the RFP server, the MGM node may initiate a verification test for IP packets that are directed towards the particular node for which the DoS IP attack had been intended. In some examples, the MGM node may execute an algorithm that initiates a unicast reverse path forwarding verification, which is intended to verify the veracity of a source IP address.

At 606, the MGM node may determine that a first subset of IP packets that were intended for delivery to the particular node, did not pass the verification test. In doing so, the MGM node may quarantine the subset of IP packets, thereby preventing their delivery to the particular node. Alternatively, or additionally, the subset of IP packets may be erased.

At 608, the MGM node may determine that a second subset of IP packets, intended for delivery to the particular node, passed the verification test. In doing so, the MGM node may execute an algorithm to determine whether at least one IP packet is an anti-attack IP packet sent by the RFP server. In this instance, the MGM node may execute an algorithm that parses through data within an IP header of each IP packet to identify a corresponding Explicit Congestion Notification (ECN) value. It is noteworthy that the RFP server may set the ECN value of an anti-attack IP packet to a particular integer that is intended to self-identify the IP packet as an anti-attack IP packet. Thus, by parsing through the data within an IP header of each IP packet, the MGM node may identify an IP packet as an anti-attack IP packet based at least in part on the ECN values found within their corresponding IP headers.

At 610, the MGM node may generate one or more filters to block incoming IP packets based at least in part on the data within the anti-attack IP packets. For example, the anti-attack IP packets may include a source IP address that initiated delivery of the DoS IP attack, and a destination IP address that was intended for delivery of the DoS IP attack. Thus, the MGM node may generate at least a first filter blocking IP packets from the source IP address, and a second filter blocking IP packets from delivery to the destination IP address.

It is noteworthy that the MGM node may generate at least one filter blocking incoming IP packets from the destination IP address based at least in part on the alert received from the RFP server. As mentioned earlier, the alert from the RFP server may include an indication of the intended destination IP address for the DoS IP attack.

In various examples, the MGM node may generate one or more filters based on predetermined thresholds set by the RFP server. For example, the RFP server may set predetermined thresholds that filter the delivery or receipt of the IP packets that are greater than a predetermined file size. Alternatively, or additionally, the RFP server may generate criteria intended to filter the delivery or receipt of IP packets based on a frequency by which the IP packets are being received from various source IP addresses or a frequency by which IP packets are being delivered to various destination IP addresses.

At 612, the MGM node may generate filter metrics that indicate a number of instances that one or more filters block incoming IP packets based on criteria such as source IP address, destination IP address, file size of IP packets, and a frequency by which IP packets are being sent from a source IP address or delivered to a destination IP address.

At 614, the MGM node may transmit the filter metrics to the RFP server. In doing so, the RFP server may interrogate the filter metrics and determine whether to adjust predetermined thresholds, such as a file size of incoming IP packets, or a frequency by which IP packets are being received or delivered. Further, filter metrics may evince that a particular source IP address is no longer transmitting DoS IP attacks. In doing so, the RFP server may elect to disable an associated filter that may be blocking IP packets from the particular source IP address.

Figure 7:
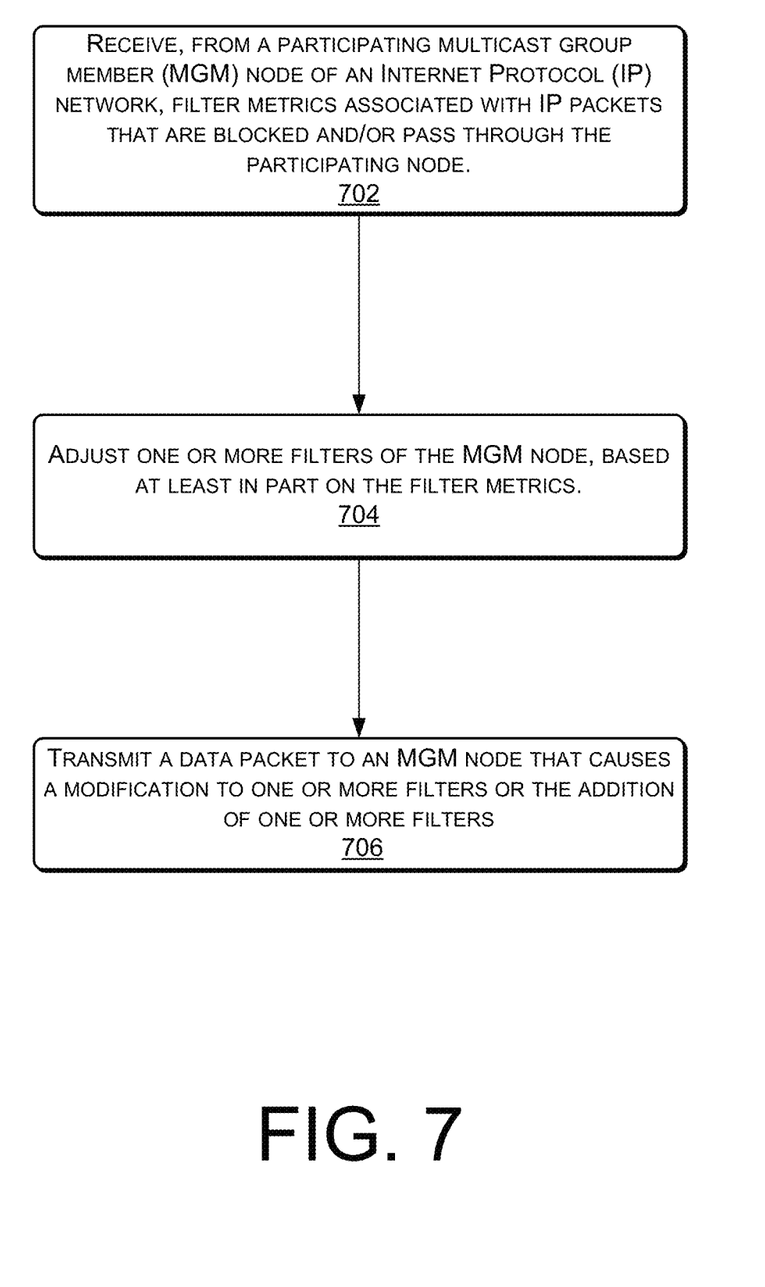
FIG. 7 illustrates a flow diagram of a RFP server process for receiving filter metrics associated with a communication of IP packets via a multicast network, and adjusting one or more corresponding filters based at least in part on the filter metrics.

FIG. 7 illustrates a flow diagram of a Real-Time Filter Policy (RFP) Server process for receiving filter metrics associated with a communication of IP packets via a multicast network, and adjusting one or more corresponding filters based at least in part on the filter metrics. In various examples, the RFP server may receive filter metrics from one or more nodes within the multicast network.

At 702, the RFP server may receive, from a participating multicast group member (MGM) node within an Internet Protocol (IP) multicast network, filter metrics associated with IP packets that are blocked at the participating node, pass though the participating node, or a combination of both. The filter metrics may include a number of instances in which one or more filters block incoming IP packets based on criteria such as source IP address, destination IP address, file size of IP packets, and a frequency by which IP packets are being sent from a source IP address or delivered to a destination IP address.

At 704, the RFP server may adjust one or more filters of a MGM node, based at least in part on the filter metrics. In a first non-limiting example, a filter associated with a MGM node may block delivery of IP packets that initiate from a particular source IP address. Over time, the RFP server may determine that a number of instances of IP packets being sent from the blocked source IP address is less than a predetermined threshold, and in doing so, may adjust the filter parameter to disable the filter. In a second non-limiting example, filter metrics may show that even though a file size of IP packets may be less than a predetermined file size, a frequency of IP packets being sent from a particular source IP address, or being delivered to a particular destination IP address are above a predetermined threshold that is likely to cause congestion. Thus, the RFP server may adjust a filter, or create a new filter, that permits passage of IP packets based on the frequency by which IP packets are passing through the MGM node.

At 706, the RFP server may transmit a data packet to an MGM node that causes a modification to one or more filters that control the receipt and delivery of IP packets. Alternatively, or additionally, the data packet may further add new filters to the MGM node.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:
1. A real-time filtering policy (RFP) system comprising:
one or more processors;
memory coupled to the one or more processors, the memory including one or more components that are executable by the one or more processors to:
receive, from a node, a first message indicating that a Denial of Service (DoS) Internet Protocol (IP) attack has been detected as being directed towards a computing device, the first message including a data file associated with the DoS IP attack;
parse the data file to retrieve an IP header, the IP header including a source IP address from which the DoS IP attack originated and a destination IP address that is associated with the computing device;
identify a plurality of Multicast Group Member (MGM) nodes within an IP network that are positioned substantially along a communication path between the source IP address and the destination IP address;
transmit, to the plurality of MGM nodes, a second message indicating that the DoS IP attack has been detected as being directed towards the computing device; and
receive, from at least one MGM node of the plurality of MGM nodes, filter metrics that indicate a number of instances that one or more filters of the at least one MGM node have blocked delivery of IP packets, based at least in part on the second message.

2. The RFP system of claim 1, wherein the plurality of MGM nodes associated with transmission of the second message corresponds to substantially all MGM nodes within the IP network.

3. The RFP system of claim 1, wherein individual nodes of the plurality of MGM nodes are communicatively connected to the RFP system such that the RFP system simultaneously communicates with the plurality of MGM nodes at a same time.

4. The RFP system of claim 1, wherein the IP header of the data file associated with the DoS IP attack is a first IP header, and wherein the one or more components are further executable by the one or more processors to:
generate a second IP header, the second IP header having a source IP address field, a destination IP address field, and an Explicit Congestion Notification (ECN) field;
assign the source IP address from the data file to the destination IP address field of the second IP header;
assign the destination IP address from the data file to the source IP address field of the second IP header;
assign a particular integer to the ECN field of the second IP header, the particular integer corresponding to an indication of upstream congestion in a communications network path;
generate an anti-attack IP packet that includes the second IP header; and
transmit the anti-attack IP packet to the source IP address.

5. The RFP system of claim 1, wherein the one or more components are further executable by the one or more processors to:
modify the data file associated with the DoS IP attack to create a modified data file, by performing acts that:
replace content of a destination IP field within the IP header with the source IP address;
replace content of a source IP address field within the IP header with the destination IP address;
replace content of an ECN field within the IP header with a particular integer that corresponds to an indication of upstream congestion in a communications network path;
generate an anti-attack IP packet includes that the modified data file; and
transmit the anti-attack IP packet to the source IP address.

6. The RFP system of claim 1, wherein the node that indicates that the DoS IP attack has been detected is at least one of a security device, fire wall, or an intrusion detection system.

7. The RFP system of claim 1, wherein the one or more components are further executable by the one or more processors to:
generate filter criteria, based at least in part on the filter metrics; and
transmit the filter criteria to a plurality of nodes within the IP network.

8. One or more non-transitory computer-readable media storing computer-executable instructions that, when executed on one or more processors, cause the one or more processors to perform acts comprising:

receiving, from a real-time filtering policy (RFP) system, a message indicating that a Denial of Service (DoS) Internet Protocol (IP) attack has been detected as being directed towards a computing device, the message including a source IP address from which the DoS IP attack had originated and a destination IP address associated with the computing device;

initiating a verification test for IP packets that are directed towards the destination IP address, based at least in part on the message, the verification test verifying an authenticity of source IP addresses of the IP packets;

determining that individual source IP addresses associated with a portion of the IP packets are authentic, based at least in part on the verification test;

identifying an anti-attack IP packet from the portion of the IP packets based at least in part on an Explicit Congestion Notification (ECN) Field value within an IP header of the anti-attack IP packet, the ECN value corresponding to a particular integer that indicates upstream congestion in a communication path;

generating at least one filter based at least in part on the source IP address within the anti-attack IP packet, the at least one filter to block delivery of IP packets received from the source IP address;

generating filter metrics that indicate a number of instances associated with delivery of IP packets that the at least one filter has blocked; and transmitting, to the RFP system, the filter metrics.

9. The one or more non-transitory computer-readable media of claim 8, further comprising:

generating an additional filter based at least in part on the destination IP address within the anti-attack IP packet, the additional filter to block the delivery of IP packets to the destination IP address;

generating additional filter metrics that indicate an additional number of instances associated with the delivery of IP packets that the additional filter has blocked; and transmitting, to the RFP system, the additional filter metrics.

10. The one or more non-transitory computer-readable media of claim 8, wherein the portion of IP packets that are authentic is a first portion of IP packets, and further comprising:

determining that the individual source IP addresses of a second portion of the IP packets are not authentic, based at least in part on the verification test; and discarding the second portion of the IP packets.

11. The one or more non-transitory computer-readable media of claim 8, further comprising:

receiving filter criteria from the RFP system, based at least in part on the filter metrics, the filter criteria providing a threshold that regulates a permissible file size of IP packets from the source IP address, or a permissible frequency by which the IP packets are sent from the source IP address; and modifying the at least one filter to incorporate the threshold based at least in part on the filter criteria.

12. The one or more non-transitory computer-readable media of claim 8, further comprising:

receiving filter criteria from the RFP system, the filter criteria to provide thresholds that regulate a passage of IP packets at individual nodes, the filter criteria including at least one of a permissible file size of IP packets, a first permissible frequency by which the IP packets are sent from the source IP address, or a second permissible frequency by which the IP packets are delivered to the destination IP address; and generating, additional filters based at least in part on the filter criteria.

13. The one or more non-transitory computer-readable media of claim 8, wherein the verification test corresponds to a unicast reverse path forwarding verification of the IP packets being directed towards the destination IP address.

14. A computer-implemented method, comprising:

under control of one or more processors:

receiving, from a security node associated with a computing device, a first message indicating that a Denial of Service (DoS) Internet Protocol (IP) attack has been detected as being directed towards the computing device, the first message including a data file associated with the DoS IP attack;

parsing the data file to retrieve an IP header, the IP header including a source IP address of the DoS IP attack and a destination IP address associated with the computing device;

transmitting, to a plurality of Multicast Group Member (MGM) nodes associated with an IP network, a second message indicating that the DoS IP attack has been detected as being directed towards the computing device, the second message including at least the destination IP address associated with the computing device; and receiving, from the plurality of MGM nodes, filter metrics that indicate a number of instances that one or more filters associated with individual MGM nodes of the plurality of MGM nodes have blocked delivery of IP packets, wherein the filter metrics are based at least in part on the second message.

15. The computer-implemented method of claim 14, wherein the filter metrics indicate a number of instances of delivery or receipt of IP packets that individual filters has blocked.

16. The computer-implemented method of claim 14, further comprising:

generating filter criteria based at least in part on the filter metrics, the filter criteria providing a threshold value that regulates a flow of IP packets through individual nodes of the IP network, the filter criteria corresponding to at least one of the source IP address, the destination IP address, a permissible file size of IP packets from the source IP address, a first permissible frequency by which IP packets are sent from the source IP address, or a second permissible frequency by which the IP packets are delivered to the destination IP address; and transmitting the filter criteria to a plurality of nodes within the IP network.

17. The computer-implemented method of claim 14, further comprising:

determining a set of MGM nodes within the IP network that are positioned substantially along a communication path between the source IP address and the destination IP address, and wherein the plurality of MGM nodes associated with transmission of the second message corresponds to the set of MGM nodes within the IP network.

18. The computer-implemented method of claim 14, wherein the plurality of MGM nodes associated with transmission of the second message corresponds to substantially all nodes within the IP network.

19. The computer-implemented method of claim 14, further comprising:

generating an anti-attack IP packet that includes an Explicit Congestion Notification (ECN) value, based at least in part on the IP header of the data file, the ECN value being a particular integer that indicates upstream congestion in a communications network path.

* * * * *